United States Patent [19]

Mori et al.

[11] B 3,992,017

[45] Nov. 16, 1976

[54] PICKUP CARTRIDGE

[75] Inventors: Yoshihisa Mori, Tokyo; Kazuo Shimura, Hatogaya; Hiroyuki Watanabe, Fujisawa, all of Japan

[73] Assignee: Sony Corporation, Tokyo, Japan

[22] Filed: Nov. 22, 1974

[21] Appl. No.: 526,388

[44] Published under the second Trial Voluntary Protest Program on February 3, 1976 as document No. B 526,388.

[30] Foreign Application Priority Data

Nov. 23, 1973 Japan ........................ 48-135377[U]

[52] U.S. Cl. ......................... 274/37; 179/100.41 M

[51] Int. Cl.[2] ...................... G11B 3/02; H04R 1/16; H04R 11/08

[58] Field of Search ............................... 274/37, 38; 179/100.41 M, 100.41 D

[56] References Cited

UNITED STATES PATENTS 3,377,439 4/1968 Rouy ................................ 274/37 X

FOREIGN PATENTS OR APPLICATIONS 1,112,130 5/1968 United Kingdom.................. 274/37

OTHER PUBLICATIONS

Seymour; Raymond B., Fillers for Molding Compounds, 1968, Modern Plastics Encyclopedia, p. 578.

"On the Damping of Phono Styli," by B. B. Bauer, Journal of the Audio Engineering Society, July 1964, vol. 12, No. 3, pp. 210–213.

*Primary Examiner*—Richard E. Aegerter
*Assistant Examiner*—Steven L. Stephan
*Attorney, Agent, or Firm*—Lewis H. Eslinger; Alvin Sinderbrand

[57] ABSTRACT

A pickup cartridge having a vibrating member including a cantilever arm with a reproducing stylus and a permanent magnet, an elastromeric damping member formed into a come or the like shape for supporting the vibrating member as its fulcrum, and a holder supporting the damping member.

7 Claims, 7 Drawing Figures

PICKUP CARTRIDGE

BACKGROUND OF THE INVENTION

1. FIeld of the Invention

The present invention relates generally to a pickup cartridge, and more particularly to a pickup cartridge with an improved damper.

2. Description of the Prior Art

Prior art pickup cartridges of the moving magnet type consist of a cantilever with a reproducing stylus at its free end, a rod-shaped magnet magnetized to have N-and S-poles in its longitudinal direction, a sleeve coupling the cantilever to the magnet, and a damper that consists of a disc of synthetic rubber or the like for elastically supporting the cantilever and forming the fulcrum of the vibration of the stylus when the stylus traces a sound groove. The disc is supported by a cylindrical holder.

Such a prior art pickup cartridge is simple in construction and can be mass produced at low cost. Further, it is easy to adjust and has good damping action. Therefore, such pickup cartridges are widely used.

However, in such cartridges the cantilever is apt to be moved forward or backward longitudinally due to the friction between the stylus and the modulated sound groove. Consequently the fulcrum of the cantilever may be shifted easily.

An improved pickup cartridge for eliminating the above defects has been proposed in the art. Its holder is closed at its rear portion and a damper similar to the one just described is provided in front of the closed portion or the innermost end of a cylindrical concave portion. In front of the damper there are arranged a disc-shaped magnet, a cantilever and a sleeve. In addition, a tension sleeve is inserted into the closed portion through the axis thereof to be coupled to the damper for adjusting the front and rear positions of the damper. A tension wire extends through the sleeve to the cantilever which is used to determine the position of the cantilever by adjusting the position of the sleeve.

According to the latter embodiment of the prior art, the stretching condition of the tension wire at adjustment poses a problem. The reason is that the strength of the tension wire affects the damping action of the damper. Also, reasonances of the wire cannot be neglected. In conclusion, the latter prior art cartridges have non-uniform characteristics.

SUMMARY OF THE INVENTION

It is an object of the present invention to provide a novel pickup cartridge free from the defects of the prior art.

It is another object of the present invention to provide a pickup cartridge in which the stiffness of a damper supporting a vibrating means in the axis direction of the damper is made greater than that in a direction perpendicular to the axis and in which the fulcrum of a vibrating means is held at a predetermined position to improve the damping characteristics.

It is a further object of the present invention to provide cartridge that can be made at low cost and is suitable for mass production.

It is a further object of the present invention to provide a pickup cartridge that has a cone-shaped or other non-flat damper.

It is a still further object of the present invention to provide a pickup cartridge with a damper containing carbon fibers.

It is a still further object of the present invention to provide a pickup cartridge in which the equivalent mass of the stylus can be made small to expand the reproduction range to a higher frequency band and to improve cross-talk characteristics.

According to the present invention there is provided a pickup cartridge that comprises a vibrating means including a cantilever arm with a reproducing stylus at the forward end thereof, a damper dormed into a cone or other protuberant shape for supporting the vibrating means on its fulcrum, and a holder for supporting the periphery of the damper.

The other objects, features and advantages of the present invention will become apparent from the following description taken in conjunction with the accompanying drawings.

DESCRIPTION OF THE PREFERRED EMBODIMENTS

Figure 1:
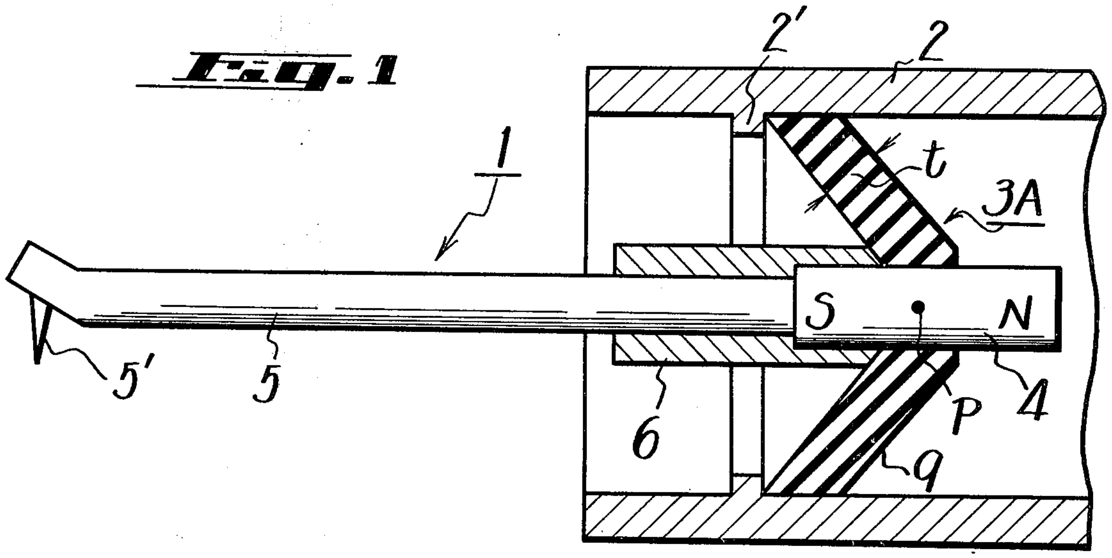
FIG. 1 is a schematic cross-sectional view of one embodiment of a pickup cartridge according to the present invention.

FIG. 1 shows, in simplified form, a cross-sectional view of a moving magnet type pickup cartridge according to the present invention. The cartridge includes a cylindrical holder 2 into which a damper 3A of a conical or other protuberant shape is inserted. A vibrating member 1 consisting of a rod-shaped magnet 4 and a cantilever arm 5 is supported from the cylindrical holder 2 by the damper 3A so that the magnet and arm extend generally along the center axis of the cylindrical holder 2. A stylus 5' is attached to the free end portion of the cantilever 5 and the fulcrum of the vibrating member 1 is positioned at the center P of the damper 3A when the stylus 5' traces a sound groove of, for example, a record disc (not shown). A sleeve 6 joins the cantilever 5 to the magnet 4.

Figure 2:
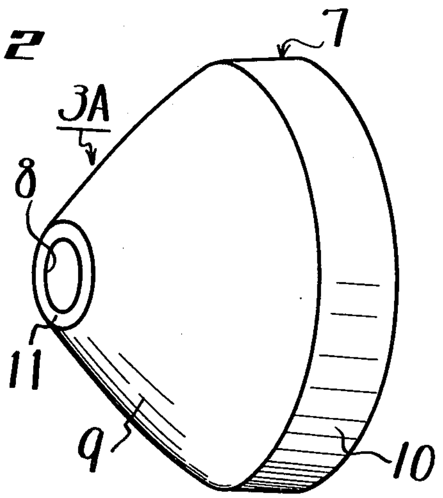
FIG. 2 is a perspective view of the damper used in the pickup cartridge shown in FIG. 1.

The damper 3A used in the embodiment of FIG. 1 is shown in FIG. 2 and is made of rubber by molding. It is an obtuse-angled conical frustum 9 that has a base 10 and a small end 11. A peripheral surface 7 is formed on the base 10 of the damper 3A, which peripheral surface 7 engages with the inner surface of the cylindrical holder 2 to support the damper. An aperture 8 is formed in the damper 3A at the small end 11 for receiving the magnet 4. When the damper 3A is inserted into the cylindrical holder 2 to be engaged thereby, the damper 3A is positioned by an annular projection 2' that extends from the inner surface of the cylindrical holder 2 inwardly at a predetermined position.

Figure 3:
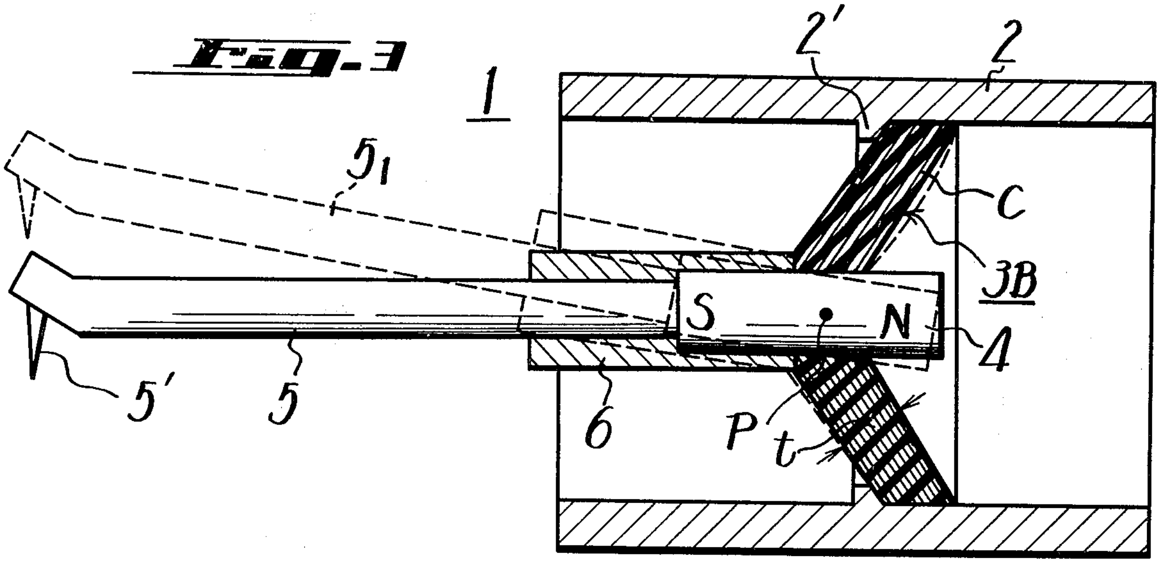
FIG. 3 is a schematic cross-sectional view of another embodiment of a pickup cartridge according to the present invention.

FIG. 3 shows a cross-sectional view of another embodiment of a pickup cartridge of the present invention. Parts in FIG. 3 similar to those in FIG. 1 are denoted by the same reference numerals.

In the embodiment of FIG. 3, a frusto-conical damper 3B to support the cantilever 5 is molded of an elastomeric material such as synthetic rubber in which, for example, carbon fibers are arranged in the direction of generatrices of the frustoconical damper 3B.

Figure 4A:
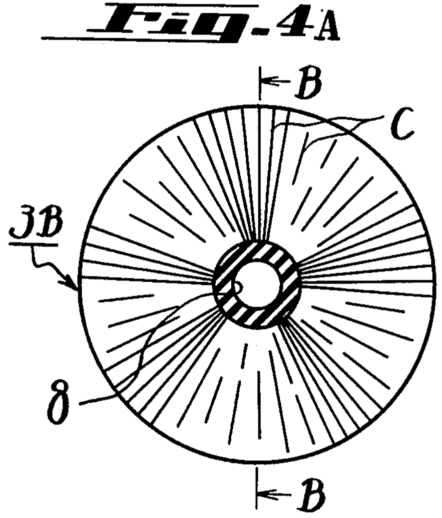
FIG. 4A is a front view of the damper used in the embodiment shown in FIG. 3.
Figure 4B:
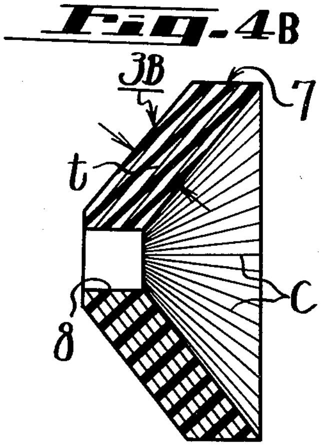
FIG. 4B is a cross-sectional view of the damper taken along the line B—B in FIG. 4A.

FIG. 4A is the front view of the damper 3B and FIG. 4B is a cross-sectional view taken on the line B—B in FIG. 4A for showing the directions of the carbon fibers C mixed into the material of the damper 3B. In the embodiments shown in FIGS. 1 and 3, the thickness *t* of the dampers 3A and 3B can be determined in accordance with experiments. Since the dampers 3A and 3B shown in FIGS. 1 to 4B are selected to be frusto-conical in shape, their stiffness in the axial direction is much higher than the axial stiffness of a disc-shaped damper. In addition, the following characteristics of the cantilever 5 for the direction of signals recorded in a modulated groove in a record are increased. Further, since there is obtained a good damping action, the equivalent mass of the stylus $5'$ can be made small to expand the reproduction range to a higher frequency. The cross-talk characteristics of such a structure are also much improved over the audio range.

FIG. 3 also shows the cantilever 5 in dotted lines to illustrate it in a displaced position $5_1$. As may be seen, the vibrating fulcrum P remains in its original location, and this is true even when an axial force is applied to the cantilever 5.

According to the second embodiment of the present invention shown in FIG. 3, the damper 3B is formed with the carbon fibers C, chosen because of their Young's modulus and modulus of elasticity, which result in good acoustic characteristics, embedded in a damping material such as synthetic rubber. The carbon fibers C are preferably arranged in the directions of generatrices of the frusto-conical damper 3B, so that the axial stiffness of the damper is increased and hence the effect mentioned above is increased further.

The dampers of the present invention are formed to be protuberant. Therefore, the modulus of section of the damper of the invention in its axial direction differs from that of the prior art disc damper, so that the axial stiffness of the damper of the invention is much higher than the stiffness in the directions in which the stylus is required to move to play back information recorded on a phonograph disc. Accordingly, it may be obvious that it is not always necessary to make the damper of material containing the carbon fibers, as in the foregoing embodiment. The purpose of the present invention can be sufficiently achieved by a damper made of synthetic rubber only.

The damper 3A in FIG. 1 protrudes in the opposite direction from the damper 3B in FIG. 3, but this difference poses no substantial problem.

Figure 5:
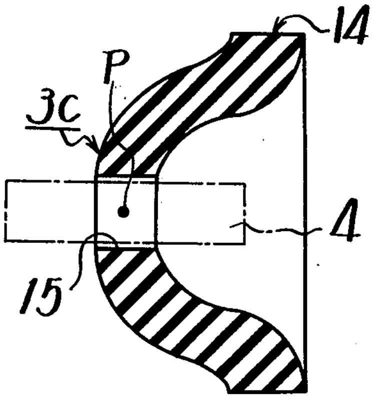
FIGS. 5 and 6 are cross-sectional view of other embodiments of dampers that can be used in the present invention.
Figure 6:
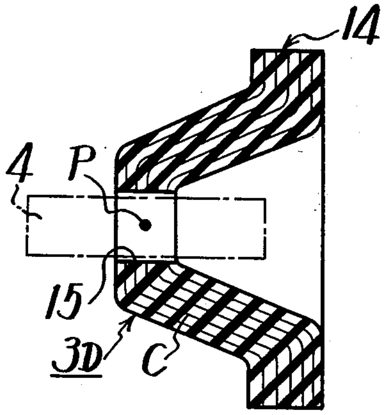

FIGS. 5 and 6 show cross-sectional views of other damper embodiments according to the present invention. The main part of the damper 3C shown in FIG. 5 has a substantially hemispherical shape with an outwardly curved peripheral surface 14 to engage the inner surface of the cylindrical holder 2 and an axially located aperture 15 for receiving the magnet 4 of FIG. 1. The damper 3D shown in FIG. 6 has a main part with a substantially frusto-conical shape and a flange 14 that extends radially outwardly at the base end and a flattened section with an axial aperture 15 at the constricted end. The damper 3C is formed of synthetic rubber only, but the other damper 3D is formed of the same material as that of the damper 3B in FIG. 3.

In the present invention, the description of the shape of the damper as being protuberant includes the shapes of the dampers 3A, 3B, 3C and 3D and other non-flat shapes. The shapes are generally symmetrical as surfaces of revolutions. It is understood that the vibrating fulcrum P in any of these protuberant shapes is positioned at one side of the plane of the base that forms the engaging member of the damper with the cylindrical holder (for example, the engaging surface 14). It is also understood that the modulus of section of the damper in the axial direction of a protuberant damper according to this invention is greater than that of a disc-shaped damper. The damper may be formed to be shell-shaped or not.

According to the present invention, almost all of the defects encountered in the prior art can be eliminated and the superior effects described above can be performed. Accordingly, the pick-up cartridge according to the present invention serves to improve a record player and is suitable for use with various record players from simple types to high fidelity players.

In the aforesaid embodiments of the present invention, the holder 2 is cylindrical and the vibrating member 1 uses a rod-shaped magnet 4, but it may be apparent that other embodiments including modified forms of these elements could be made without departing from the true scope of the invention determined by the following claims.

What is claimed is:

1. A pickup cartridge comprising:

A. vibrating means comprising a cantilever arm;

B. an elastomeric support and damper member in the form of a centrally apertured member formed as a surface of revolution and comprising two major surfaces, one generally convex and the other generally concave, said vibrating means being supported in the aperture of said member, said member extending outwardly from the axis of said arm to the outer perimeter of said member, whereby said vibrating means pivots about axes that pass transversely through said vibrating means at the region thereof grasped by the perimeter of said aperture, said region being offset to one side of a plane passing through said outer perimeter;

C. a holder for supporting said elastomeric member along said outer perimeter; and D. fibers extending outwardly from the center of said support member along generatrices thereof providing a greater stiffness in the axial direction of the member than in a direction perpendicular thereto.

2. A pickup cartridge as claimed in claim 1 in which said fibers are carbon fibers.

3. A pickup cartridge as claimed in claim 1, wherein a permanent magnet is attached to said cantilever arm.

4. A pickup cartridge as claimed in claim 3, wherein said permanent magnet is fixed to said cantilever arm by a supporting sleeve.

5. A pickup cartridge comprising:

A. a holder;

B. vibrating means comprising a cantilever arm and a reproducing stylus attached thereto at one end thereof;

C. an elastomeric support and damper member for supporting said vibrating means, the periphery of the elastomeric member being fixed to said holder, said elastomeric member having a thickness substantially less than the maximum distance between points on said periphery and being formed as a surface of revolution a line other than one which is perpendicular to the axis of revolution and having a greater stiffness in the axial direction of the member than in a direction perpendicular thereto, said vibrating means extending through a central aperture in said member and being pivotally held thereby; and D. fibers embedded in said elestomeric elastomeric and extending outwardly from the center of said support member along generatrices thereof.

6. A pickup cartridge as claimed in claim 5, wherein said elastomeric member is formed into a frusto-conical shape.

7. A pickup cartridge as claimed in claim 5, wherein said elastomeric member has a generally hemispherical shape.

* * * * *